United States Patent
Inokuchi (10) Patent No.: US 8,891,122 B2
(45) Date of Patent: Nov. 18, 2014

(54) ELECTRONIC APPARATUS, CONNECTOR-CONNECTION-STATE DETECTION METHOD, AND COMPUTER PROGRAM PRODUCT

(71) Applicant: Sumihiro Inokuchi, Kanagawa (JP)

(72) Inventor: Sumihiro Inokuchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/857,450

(22) Filed: Apr. 5, 2013

(65) Prior Publication Data

US 2013/0265603 A1   Oct. 10, 2013

(30) Foreign Application Priority Data

Apr. 9, 2012   (JP) .................................. 2012-088363
Mar. 25, 2013   (JP) .................................. 2013-062724

(51) Int. Cl.
*H04N 1/00*   (2006.01)
*H04N 1/32*   (2006.01)

(52) U.S. Cl.
CPC .... *H04N 1/00007* (2013.01); *H04N 2201/0081* (2013.01); *H04N 1/32625* (2013.01); *H04N 2201/0082* (2013.01); *H04N 2201/0091* (2013.01); *H04N 2201/0093* (2013.01); *H04N 1/32593* (2013.01); *H04N 1/00031* (2013.01)
USPC ..................................................... 358/1.15

(58) Field of Classification Search
USPC ..................................................... 358/1.15
See application file for complete search history.

(56) References Cited

U.S. PATENT DOCUMENTS

2010/0088456 A1* 4/2010 Chu et al. ....................... 710/316
2010/0290086 A1* 11/2010 Funahashi ..................... 358/1.15
2011/0243002 A1* 10/2011 Tsuruoka ....................... 370/252

FOREIGN PATENT DOCUMENTS

JP   2000-307762   11/2000
JP   2009-037300   2/2009

* cited by examiner

*Primary Examiner* — Qian Yang
(74) *Attorney, Agent, or Firm* — Oblon, Spivak, McClelland, Maier & Neustadt, L.L.P.

(57) ABSTRACT

An electronic apparatus includes a connection-state detection circuit. The circuit includes a first circuit board; a plurality of second circuit boards that each exchange a signal with the first circuit board; a plurality of connectors that connect the first circuit board and each of the second circuit boards, respectively; a transmitting unit that transmits a connection-state detection signal from the first circuit board to each of the second circuit boards via the connectors; a control unit that causes the second circuit boards to return response signals to the first circuit board in response to the received connection-state detection signal via the connectors at different times that are shifted from each other and are respectively allocated to the second circuit boards; and a detecting unit that detects whether the response signal returned from each of the second circuit boards is received to detect a connection state of each of the connectors.

10 Claims, 6 Drawing Sheets

ELECTRONIC APPARATUS, CONNECTOR-CONNECTION-STATE DETECTION METHOD, AND COMPUTER PROGRAM PRODUCT

CROSS-REFERENCE TO RELATED APPLICATIONS

The present application claims priority to and incorporates by reference the entire contents of Japanese Patent Application No. 2012-088363 filed in Japan on Apr. 9, 2012 and Japanese Patent Application No. 2013-062724 filed in Japan on Mar. 25, 2013.

BACKGROUND OF THE INVENTION

1. Field of the Invention

The present invention relates to an electronic apparatus, a connector-connection-state detection method, and a computer program product.

2. Description of the Related Art

In conventional electronic apparatuses that have circuit boards that exchange signals with each other, FFC (flexible flat cable) harnesses and connectors that connect the terminals of the FFC harnesses to circuits are used for connection between the circuit boards. The strength of an FFC is low and the end portions are easily broken. Moreover, conventional electronic apparatuses have a structure in which a lock is pushed down after the connector is inserted. With this structure, a harness may be pulled out during the operation of pushing down the lock; therefore, semi-insertion of a harness easily occurs. In order to solve semi-insertion that occurs in such a situation, for example, a technique is proposed that prevents semi-insertion by punching the tip portion of a harness by using a structure with a hook and pushing down the lock after inserting and fixing the punched tip portion.

In addition, in view of the fact that it is difficult to completely prevent a bad connection as described above that may occur in a connector, a method is proposed that detects the connection state so that when a bad connection occurs, the connection state can be repaired and returned to its normal state as soon as possible (for example, see Japanese Patent Application Laid-open No. 2009-37300). Japanese Patent Application Laid-open No. 2009-37300 describes a connector-connection-state detecting device that detects withdrawal of a connector that connects a control board and loads to be controlled thereby with a harness. This connector-connection-state detecting device performs a detection operation using a CPU (Central Processing Unit) mounted on the control board. Specifically, the connector-connection-state detecting device transmits a pulled-up signal to the end portion of a harness, divides the signal by pulling down the signal in the control board at a harness connection destination with a resistance value that is different for each connector, returns the divided signal to the control board, and detects the divided voltage value by using the CPU. With this detection method (signal voltage detection method), the detected voltage value is different depending on the point at which the connection of a connector is broken; therefore, it is possible to identify the point at which the connection is broken on the basis of the detected voltage value.

However, in the signal voltage detection method described in Japanese Patent Application Laid-open No. 2009-37300, because a different resistance value is set for each of the connectors and the divided voltage largely depends on the smallest resistance value among the resistance values, the width of the threshold voltage used when determining a connector at which the connection is broken becomes extremely narrow. Moreover, because the resistance components that the harnesses and the connectors have also affect the divided voltage as external factors, there is a problem in that the divided voltage easily varies and an extremely high accuracy is required to realize this method when used with a plurality of connectors.

Therefore, there is a need for an electronic apparatus and a connector-connection-state detection method capable of suitably detecting the connection state of each of a plurality of connectors.

SUMMARY OF THE INVENTION

According to an embodiment, there is provided an electronic apparatus that includes a connection-state detection circuit. The circuit includes a first circuit board; a plurality of second circuit boards that each exchange a signal with the first circuit board; a plurality of connectors that connect the first circuit board and each of the plurality of second circuit boards, respectively; a transmitting unit that transmits a connection-state detection signal from the first circuit board to each of the second circuit boards via their respective connectors; a control unit that causes the second circuit boards to return response signals to the first circuit board in response to the received connection-state detection signal via the connectors at different times that are shifted from each other and are respectively allocated to the second circuit boards; and a detecting unit that detects whether the response signal returned from each of the second circuit boards is received so as to detect a connection state of each of the connectors.

According to another embodiment, there is provided a A connector-connection-state detection method performed in an electronic apparatus that includes a first circuit board, a plurality of second circuit boards which each exchange a signal with the first circuit board, and a plurality of connectors that connect the first circuit board and each of the plurality of second circuit boards, respectively. The method includes transmitting a connection-state detection signal from the first circuit board to each of the second circuit boards via their respective connectors; causing the second circuit boards to return response signals to the first circuit board in response to the received connection-state detection signal via the connectors at different times that are shifted from each other and are respectively allocated to the second circuit boards; and detecting whether the response signal returned from each of the second circuit boards is received so as to detect a connection state of each of the connectors.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an electronic apparatus, a connector-connection-state detection method, and a computer program according to the present invention will be described below with reference to the accompanying drawing. The following embodiment is an example in which the present invention is applied to an electrophotographic image forming apparatus that has multiple processing functions, such as a scanner, a copier, a printer, and a fax machine.

The exemplified image forming apparatus applies a configuration in which a control unit for various devices used for processes, such as image scanning and print output, is divided into circuit modules for respective devices and signals are exchanged between these circuit modules. The image forming apparatus has a function of detecting whether a connector has a bad connection, which may occur in such a circuit configuration in which FFC harnesses and connectors that connect the terminals of the FFC harnesses to circuit modules are used.

Circuit Configuration of Image Forming Apparatus

Figure 1:
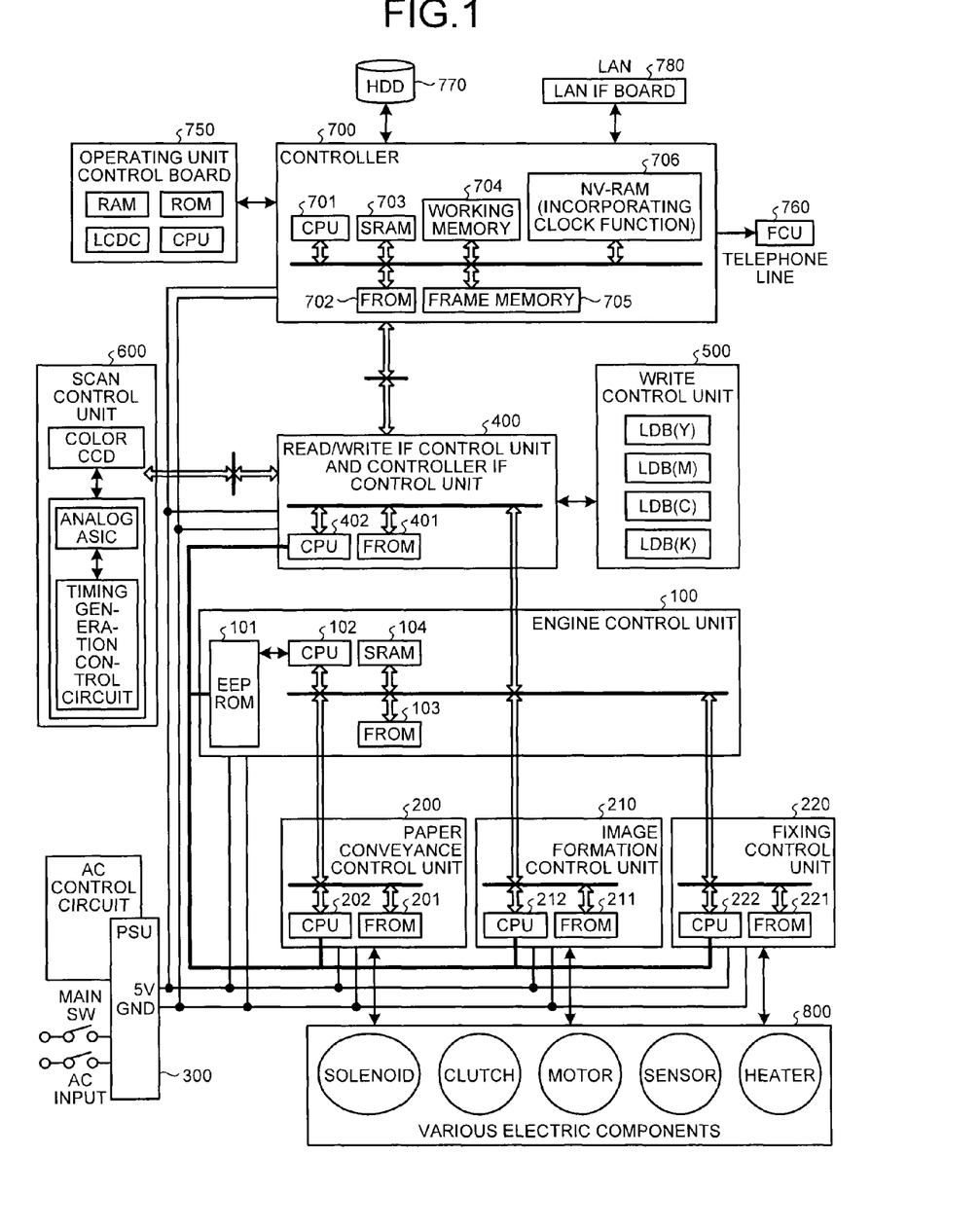
FIG. 1 is a diagram illustrating the schematic configuration of an image forming apparatus.

FIG. 1 is a diagram illustrating the schematic configuration of an image forming apparatus according to the present embodiment and illustrates the circuit configuration of the image forming apparatus focusing on the control system. As illustrated in FIG. 1, in the image forming apparatus, each circuit module is configured as an element for control (hereinafter, referred to as "control module").

In the circuit configuration of the image forming apparatus, an upper-level control module basically controls a lower-level control module. In other words, as schematically illustrated in FIG. 1, a controller 700, which is an upper-level control module, receives a command related to a job to be processed and directly or indirectly instructs each of the control units, i.e., a scan control unit 600, a write control unit 500, an engine control unit 100, a paper conveyance control unit 200, an image formation control unit 210, a fixing control unit 220, and a PSU (power control unit) 300, which are lower-level control modules, an operating unit control board 750, a FCU (Fax Control Unit) 760, and a LAN (Local Area Network) interface (IF) board 780 to perform control operations executed by applications of a scanner, a copier, a printer, a fax machine, and the like in accordance with the operating conditions specified in the command.

A read/write IF control unit and controller IF control unit 400 functions as an IF (interface) between the controller 700, the scan control unit 600, the write control unit 500, and the engine control unit 100. Moreover, a PCI (Peripheral Component Interconnect) bus is used for a signal line that connects the controller 700, the engine control unit 100, and the like via the read/write IF control unit and controller IF control unit 400.

Moreover, the operating unit control board 750 and the LAN IF board 780 are IFs that are arranged between the outside and the controller 700 so that the controller 700 receives a command related to a job that is a processing target from the outside, and notifies the outside of the processing condition and the processing result (such as image data) of the job or transmits the processing condition and the processing result to the outside. The operating unit control board 750 is a component that operates for a user who operates the image forming apparatus directly from the outside and the LAN IF board 780 is a component that operates for a network that is connected to external devices, such as a host PC (Personal Computer).

The scan control unit 600 controls a document image scanning device, such as a scanner, which scans pictures and characters on a paper medium (document) and converts the scanned pictures and characters to image data in raster format, in accordance with the instructed scanning conditions. Although not illustrated in FIG. 1, the scan control unit 600 may include a unit that inputs (outputs) images in a similar manner by an IF that performs read/write control on an electronic recording medium.

The write control unit 500 controls light emission of an LD (laser diode) on the basis of image data and performs exposure scanning on a photosensitive element with an emitted laser beam. In other words, the write control unit 500 performs optical writing control. Because the write control unit 500 operates in conjunction with the image formation control unit 210, which will be described later, the read/write IF control unit and controller IF control unit 400 functions as an upper-level control module with respect to the write control unit 500 and the image formation control unit 210.

The PSU 300 converts AC power supplied from the outside to DC power and supplies the converted DC power to each circuit board. Moreover, the AC power supplied from the outside is also used as AC power for turning on a heater that performs fixing control.

Supply of the AC power and the DC power from the PSU 300 can be controlled. The image forming apparatus performs a power-saving operation by controlling the power supply when the electronic apparatus (apparatus) is idling. For example, the image forming apparatus reduces AC power consumption by lowering the temperature of a fixing heater that is required when the apparatus is operating to the temperature when the apparatus is on standby. Moreover, the image forming apparatus reduces power consumption by stopping the supply of DC power to some of the circuit boards, such as turning off the power source for the control modules related to engine control.

The engine control unit 100 overall controls the paper conveyance control unit 200, the image formation control unit 210, and the fixing control unit 220, which control the paper conveying device, the image forming device, and the fixing device that are elements of the printer engine.

The paper conveyance control unit 200 is connected to various electric components (such as a conveying motor and a sensor) 800 related to paper conveyance. As a control function, the paper conveyance control unit 200 performs processes and controls corresponding to a detection of a jam and the like on the basis of, for example, detection results from a sensor in addition to a control of a normal conveying operation.

The image formation control unit 210 is connected to various electric components (such as a photosensitive element driving motor and a sensor) 800 related to image formation by electrophotography. As a control function, the image formation control unit 210 performs processes and controls corresponding to a detection of abnormal density and the like on the basis of, for example, detection results of a toner density sensor in addition to a control of a normal image forming process.

The fixing control unit 220 is connected to various electric components (such as a fixing heater and a temperature sensor) 800 related to fixing of a toner image to paper. The fixing control unit 220 controls a fixing process of applying heat and pressure to paper to which toner is applied and performs processes corresponding to a control of the temperature of the fixing heater, a detection of a paper jam, and the like.

The controller 700 includes as components a CPU 701, an FROM (Flash Read Only Memory) 702, an SRAM (Static Random Access Memory) 703, an NV (Non Volatile)-RAM 706, and an HDD (hard disk) 770. The CPU 701 executes instructions of software programs. The FROM 702 stores programs, control data, and the like. The SRAM 703 temporarily stores image data generated by the programs, data necessary for executing the programs, and the like and is used as a working memory 704 or a frame memory 705. The NV-RAM 706 is a nonvolatile memory that incorporates a clock function and stores, for example, setting data, such as an apparatus-specific condition, and information necessary for generation of control commands and communication with a network or the like. The HDD 770 is a high-capacity storage that stores data, programs, and the like. In other words, the controller 700 is composed of a computer configured by connecting the CPU 701, the FROM 702, the SRAM 703, the NV-RAM 706, and the HDD 770 via a bus.

Moreover, the engine control unit 100, the paper conveyance control unit 200, the image formation control unit 210, the fixing control unit 220, and the read/write IF control unit and controller IF control unit 400 include as components CPUs 102, 202, 212, 222, and 402 for executing instructions of software programs and FROMs 103, 201, 211, 221, and 401, which store programs, control data, and the like that are used by the CPUs and are used for controls, processes, and the like, respectively. The engine control unit 100 includes an SRAM 104 used as a working memory and an EEP (Electrically Erasable and Programmable) ROM 101, which is a nonvolatile memory for storing management information, such as a characteristic value or an adjustment value that is specific to a device and is used for the engine under control.

In the image forming apparatus, the engine control unit 100, which is an upper-level control unit related to the printer engine, directly controls each of the lower-level control units, i.e., the paper conveyance control unit 200, the image formation control unit 210, and the fixing control unit 220, in accordance with a command from the controller 700. In the present embodiment, the circuit boards of the control units related to the printer engine are separated from each other. In order that the upper-level and lower-level control units exchange signals with each other, an FFC harness and connectors that connect the terminals of the FFC harness to the circuit boards are provided for each circuit board of the lower-level control units, and the circuit boards are connected with each other via the connectors (see FIG. 2).

Detection of Connector Connection State

In the circuit configuration (see FIG. 1) of the image forming apparatus, the engine control unit 100, which is an upper-level control unit, exchanges data by providing an FFC harness and connectors that connect the terminals of the FFC harness to the circuit boards for each circuit board of the paper conveyance control unit 200, the image formation control unit 210, and the fixing control unit 220, and connecting the circuit board to the circuit boards of the lower-level control units by using the connectors. When the circuit boards of the upper-level engine control unit 100 and the lower-level control units are connected with each other by using the FFC harnesses and the connectors that connect the terminals of the FFC harnesses to the circuit boards in this manner, a bad connection may occur at any connector.

When a bad connection of a connector occurs, it is needed to immediately repair the bad connection; therefore, it is desirable to detect the occurrence of a bad connection as soon as possible. Thus, units for detecting a bad connection of a connector have been proposed and applied.

A unit having a simpler configuration has been applied that, in a case where there are a plurality of connectors, detects the occurrence of a bad connection without identifying the connector that causes the bad connection; however, it is necessary to identify a connector that causes a bad connection and give a notification of the connector so that the connector can be immediately repaired. In a signal voltage detection method described in Japanese Patent Application Laid-open No. 2009-37300 proposed to meet the demand, there is a problem in that the detection unit is required to have extremely high accuracy as described above.

Therefore, in order to solve the above problem, in the present embodiment, a detection method (hereinafter, "timing change multiplexing detection method") is applied in which, when connectors are normally connected, a detection signal (a response signal to be described later) is generated at times that are shifted from each other and are allocated to a plurality of circuit boards, respectively. Specifically, a connection-state detection signal is transmitted to each of the lower-level control units 200, 210, and 220 from the engine control unit 100 via the connectors. Thereafter, response signals in response to the received connection-state detection signals are returned to the engine control unit 100 from the lower-level control units 200, 210, and 220 via the connectors at times that are shifted from each other and are allocated to the lower-level control units 200, 210, and 220, respectively. Then, the connection state of a connector is determined for each of the lower-level control units 200, 210, and 220 by performing a threshold process on the reception times of the returned response signals.

Next, the configuration and the operation of a connector-connection-state detection unit by the timing change multiplexing detection method will be described.

Figure 2:
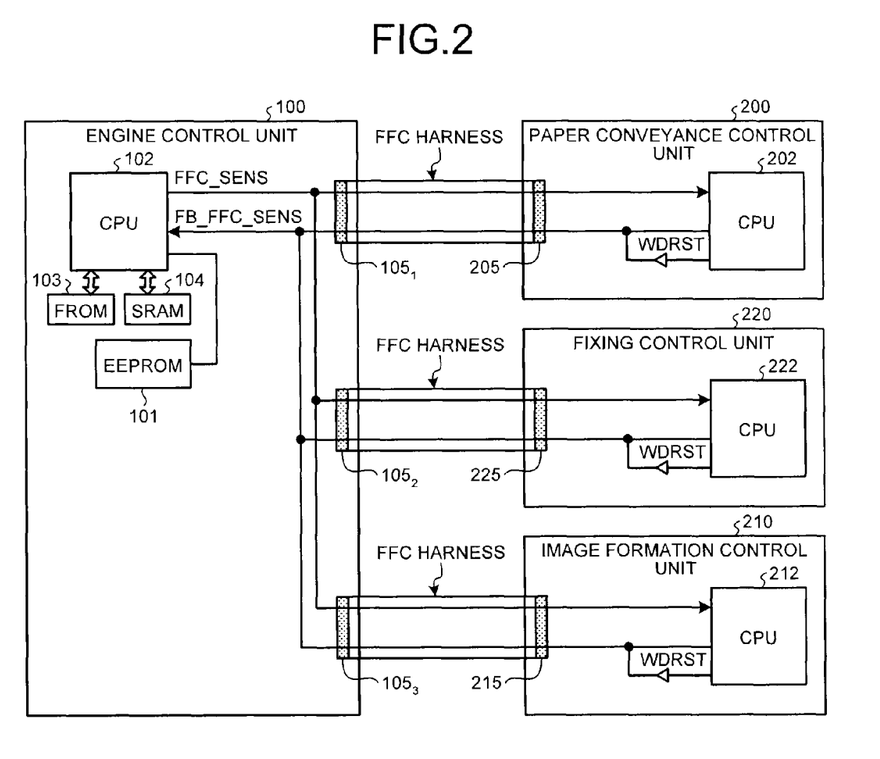
FIG. 2 is a diagram illustrating the configuration of a connector-connection-state detection circuit.

FIG. 2 is a diagram illustrating the configuration of the connector-connection-state detection circuit included in the image forming apparatus illustrated in FIG. 1. FIG. 2 illustrates the configuration of the connector-connection-state detection circuit in the control circuit portion composed of the engine control unit 100, which is an upper-level control unit, and the paper conveyance control unit 200, the image formation control unit 210, and the fixing control unit 220, which are lower-level control units and are overall controlled by the engine control unit 100, in the circuit configuration of the image forming apparatus illustrated in FIG. 1.

On the engine control unit 100 side, the signal lines from the terminal of the CPU 102 are connected in parallel to connectors $105_1$, $105_2$, and $105_3$. The connectors $105_1$, $105_2$, and $105_3$ are provided to connect the engine control unit 100 to the paper conveyance control unit 200, the image formation control unit 210, and the fixing control unit 220 via the FFC harnesses, respectively.

In contrast, on the side of the paper conveyance control unit 200, the image formation control unit 210, and the fixing control unit 220, the signal lines from the terminals of the CPU 202, 212, and 222 are connected to connectors 205, 225, and 215, respectively. The connectors 205, 225, and 215 are provided to connect the paper conveyance control unit 200, the image formation control unit 210, and the fixing control unit 220 to the engine control unit 100 via the FFC harnesses, respectively.

As described above, in the connector-connection-state detection circuit in the present embodiment, in detecting the connection state of each connector, transmission and reception of a connection-state detection signal and response signals is performed via the connectors and the FFC harnesses. Therefore, as illustrated in FIG. 2, the CPU 102 of the engine control unit 100 uses a downstream signal line of the FFC harness connected to each connector for communication of an FFC_SENS output signal, which is a connection-state detection signal, and uses an upstream signal line of the FFC harness connected to each connector for communication of an FB_FFC_SENS input signal, which is a response signal.

Moreover, the CPU 102 of the engine control unit 100 uses the upstream signal line not only for receiving a response signal (FB_FFC_SENS input signal) but also for receiving an operation abnormality signal (WDRST signal) that gives a notification of an operation abnormality that occurs in each circuit board of the paper conveyance control unit 200, the image formation control unit 210, and the fixing control unit 220. The operation abnormality signal (WDRST signal) will be described in detail later.

Separation of Response Signals

In the connector-connection-state detection circuit in the present embodiment, the CPU 102 of the engine control unit 100 transmits a connection-state detection signal to each of the paper conveyance control unit 200, the image formation control unit 210, and the fixing control unit 220 via the connectors. Then, the connector-connection-state detection circuit detects the connection state of each connector by determining whether a response signal that is returned via each connector from each of the paper conveyance control unit 200, the image formation control unit 210, and the fixing control unit 220 that has received the connection-state detection signal can be received.

As illustrated in FIG. 2, the CPU 102 of the engine control unit 100 is connected to the connectors in parallel; therefore, when the detection operation is performed, the CPU 102 receives, via a single signal line, response signals that are returned from the paper conveyance control unit 200, the image formation control unit 210, and the fixing control unit 220. Thus, in order to detect the connection state for each connector, each response signal needs to be separately detected; therefore, the timing change multiplexing detection method described above is applied.

In the timing change multiplexing detection method in the present embodiment, the paper conveyance control unit 200, the image formation control unit 210, and the fixing control unit 220 receive a connection-state detection signal (FFC_SENS output signal) at the same time. When the paper conveyance control unit 200, the image formation control unit 210, and the fixing control unit 220 return response signals (FB_FFC_SENS input signals) in response to the received connection-state detection signal (FFC_SENS output signal), the paper conveyance control unit 200, the image formation control unit 210, and the fixing control unit 220 perform a return operation at predetermined times shifted from each other. In order to perform the return operation, a different predetermined time at which an FB_FFC_SENS input signal is transmitted is allocated in advance to each of the paper conveyance control unit 200, the image formation control unit 210, and the fixing control unit 220 on the basis of a certain time, and each of the paper conveyance control unit 200, the image formation control unit 210, and the fixing control unit 220 asserts an FB_FFC_SENS input signal at the allocated predetermined time, whereby the signals can be shifted from each other.

In this manner, the paper conveyance control unit 200, the image formation control unit 210, and the fixing control unit 220 return response signals (FB_FFC_SENS input signals) at predetermined times shifted from each other. Consequently, the CPU 102 of the engine control unit 100 that receives multiplexed response signals can separately detect FB_FFC_SENS input signals for each connector and therefore can detect a bad connection and identify the connector that causes the bad connection.

In order to perform an operation of, for example, receiving and transmitting a response signal (FB_FFC_SENS input signal) described above, it is desirable that the predetermined times allocated to shift the return times from each other be managed in the connector-connection-state detection circuit in the present embodiment. For example, the predetermined times are stored in the EEPROM 101 of the engine control unit 100 and are consolidated therein.

In the operation related to a response signal, basically, the transmission side transmits response signals at return times shifted from each other on the basis of the managed predetermined times, and the reception side receives the transmitted response signals in accordance with the shifts of the response signals and confirms the reception of the response signals.

The response signals (FB_FFC_SENS input signals) may be basically signals of the same waveform as long as the return times are shifted from each other. However, in the present embodiment, the assertion periods of response signals returned from the paper conveyance control unit 200, the image formation control unit 210, and the fixing control unit 220 are made different from each other. This is because, for example, in a case where a signal generated when a signal line that transmits a response signal is short-circuited to the power source and is fixed to the High side, a signal due to malfunction (for example, CPU runaway) of the CPUs 202, 212, and 222, a noise signal mixed into a response signal, or the like is detected as a response signal, there is a possibility to lead to a false detection result that indicates that the connection state of a connector is not bad. In other words, in order to prevent false detection described above, the assertion periods are set to have predetermined durations different from each other and the threshold process is performed on the detected response signals by using these predetermined durations, whereby the false detection is eliminated and more accurate detection result of the connector connection state can be obtained.

Figure 3:
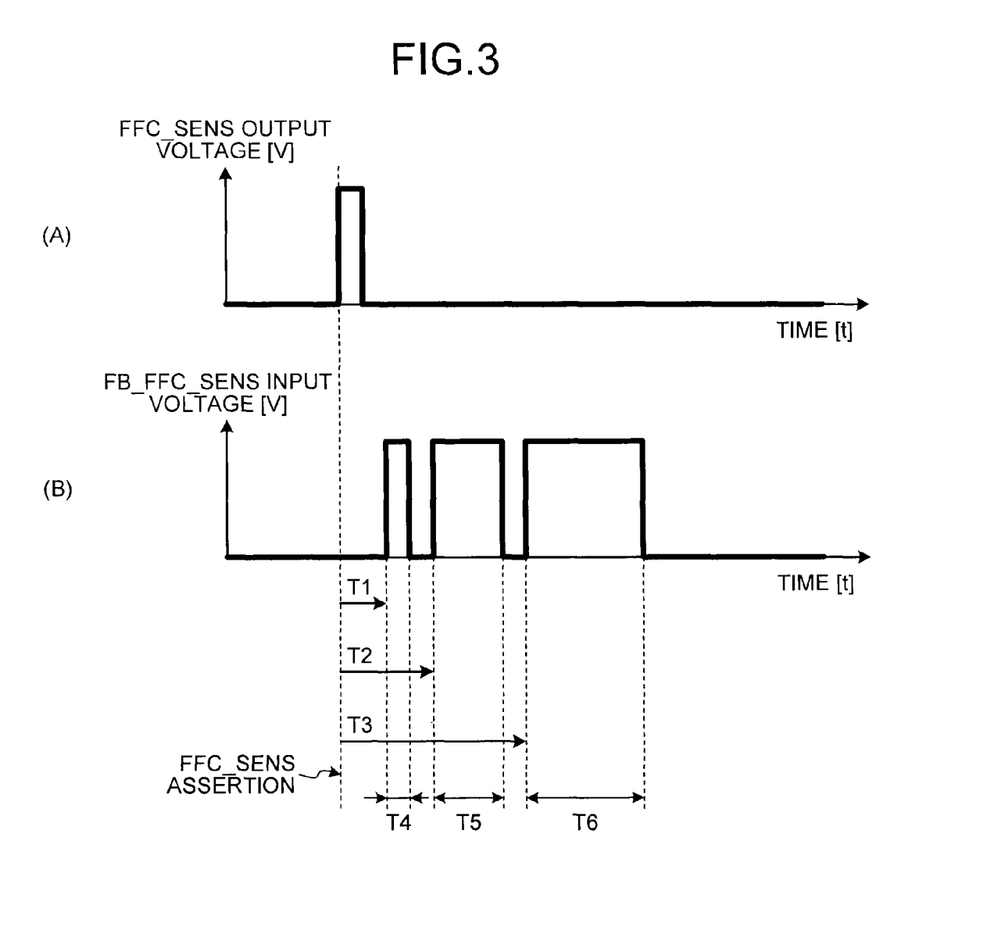
FIG. 3 is a timing chart illustrating a relationship between an FFC_SENS output signal (connection-state detection signal) and FB_FFC_SENS input signals (response signals) that are transmitted and received between circuit boards via connectors.

FIG. 3 is a timing chart illustrating a relationship between an FFC_SENS output signal and FB_FFC_SENS input signals that are transmitted and received between the circuit boards via the connectors in the connector-connection-state detection circuit. In FIG. 3, part (A) illustrates an FFC_SENS output signal and part (B) illustrates FB_FFC_SENS input signals. In FIG. 3, the horizontal axis indicates the time and the vertical axis indicates the voltage [V].

The FFC_SENS output signal in part (A) of FIG. 3 is a signal that is output from the CPU 102 of the engine control unit 100 as a connection-state detection signal and has a predetermined voltage value and assertion period. The values of the voltage value and the assertion period are set to appropriate values such that each of the CPUs 202, 212, and 222 of the paper conveyance control unit 200, the image formation control unit 210, and the fixing control unit 220 on the reception side can appropriately detect the rising edge (or falling edge) of the signal waveform.

In contrast, the FB_FFC_SENS input signals in part (B) of FIG. 3 are signals subjected to the timing change multiplexing, which are returned as response signals via the connectors from the paper conveyance control unit 200, the image formation control unit 210, and the fixing control unit 220 that receive the FFC_SENS output signal in part (A) of FIG. 3 and which are input to the CPU 102 of the engine control unit 100. The FB_FFC_SENS input signals have different assertion periods and rise at different times for each of the paper conveyance control unit 200, the image formation control unit 210, and the fixing control unit 220 that transmit the FB_FFC_ SENS input signals.

For example, the FB_FFC_SENS input signals are multiplexed in accordance with the times (T1, T2, T3) and the assertion periods (T4, T5, T6) described below.

T1: Time until the CPU 202 of the paper conveyance control unit 200 asserts the FB_FFC_SENS input signal after the FFC_SENS output signal is asserted T2: Time until the CPU 222 of the fixing control unit 220 asserts the FB_FFC_SENS input signal after the FFC_SENS output signal is asserted T3: Time until the CPU 212 of the image formation control unit 210 asserts the FB_FFC_SENS input signal after the FFC_SENS output signal is asserted T4: Period during which the CPU 202 of the paper conveyance control unit 200 asserts the FB_FFC_SENS input signal T5: Period during which the CPU 222 of the fixing control unit 220 asserts the FB_FFC_SENS input signal T6: Period during which the CPU 212 of the image formation control unit 210 asserts the FB_FFC_SENS input signal An explanation will be given of the return operation of a response signal (FB_FFC_SENS input signal) performed by each of the paper conveyance control unit 200, the image formation control unit 210, and the fixing control unit 220 in the operation example in FIG. 3. The paper conveyance control unit 200, the image formation control unit 210, and the fixing control unit 220 receive a connection-state detection signal (FFC_SENS output signal) output from the CPU 102 of the engine control unit 100 at the same time. In this example, when the control units that receive the FFC_SENS output signal return response signals (FB_FFC_SENS input signals) in response to the reception of the FFC_SENS output signal, the control units perform the return operation of returning the FB_FFC_SENS input signals that have different assertion periods (T4, T5, T6) and are asserted at the predetermined times (T1, T2, T3) allocated to return the response signals at different times to each other with reference to the assertion of the FFC_SENS output signal.

The time at which the assertion time is determined and the time at which the assertion period is determined are set by storing setting values in the FROMs 201, 211, and 221 included in the paper conveyance control unit 200, the image formation control unit 210, and the fixing control unit 220, respectively, or the like. The setting values can be set, for example, by performing an external terminal PU/PD process by each of the CPUs 202, 212, and 222 of the paper conveyance control unit 200, the image formation control unit 210, and the fixing control unit 220. The setting values can be changed by configuring an internal hard counter to be changeable by the PU/PD process. Moreover, in terms of a setting method other than the PU/PD process, it is possible to use a method of applying the setting values obtained by calculating the predetermined times by software in response to the command of setting instruction from the upper-level control unit.

As described above, because the CPUs 202, 212, and 222 of the paper conveyance control unit 200, the image formation control unit 210, and the fixing control unit 220 return response signals (FB_FFC_SENS input signals), whose assertion periods are different from each other, at predetermined times shifted from each other. Therefore, the CPU 102 of the engine control unit 100 that receives the multiplexed response signals can separately detect the FB_FFC_SENS input signals for each connector and thus can detect the connection state for a specific connector. Moreover, it is sufficient to detect the presence or absence of a signal for detecting a response signal (FB_FFC_SENS input signal); therefore, a high detection accuracy is not required. Moreover, because the assertion periods are made different from each other, false detection of a response signal can be reduced.

Procedure of Detection Operation

Figure 4:
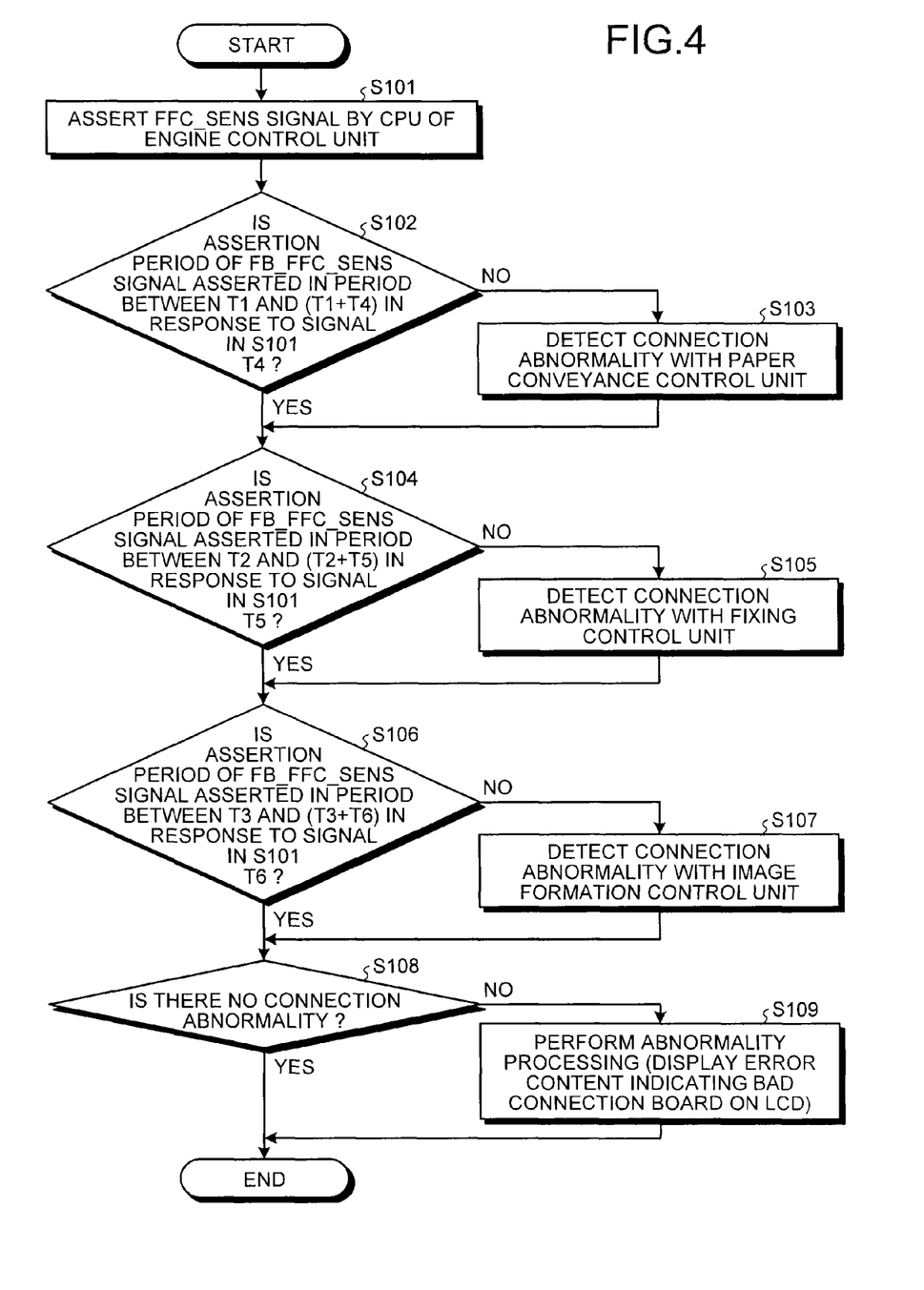
FIG. 4 is a flowchart illustrating the procedure of a detection operation of the connection state performed by the connection-state detection circuit.

An explanation will be given of the procedure of the detection operation with reference to the operation example in FIG. 3 performed by the connector-connection-state detection circuit in the present embodiment. FIG. 4 is a flowchart illustrating the procedure of the detection operation performed by the connection-state detection circuit illustrated in FIG. 2. The detection operation illustrated in the flowchart in FIG. 4 is an operation that is started and performed by the CPU 102 of the engine control unit 100 in accordance with a command from the controller 700, which is an upper-level control unit. A preferred example of the time at which the detection operation is started will be described later.

When the engine control unit 100 starts the detection operation illustrated in the flowchart in FIG. 4, the engine control unit 100 first outputs a connection-state detection signal (FFC_SENS output signal) from the CPU 102 via each of the connectors connected to the paper conveyance control unit 200, the image formation control unit 210, and the fixing control unit 220 (Step S101).

After the engine control unit 100 transmits the FFC_SENS input signal, the engine control unit 100 receives response signals (FB_FFC_SENS input signals) that are returned from the paper conveyance control unit 200, the image formation control unit 210, and the fixing control unit 220 in response to the reception of the FFC_SENS output signal and performs the detection process of the connection state of a connector on the input FB_FFC_SENS input signals in the procedure in the following steps.

The detection process of the connection state of a connector separately detects response signals that are multiplexed and returned as signals that are asserted at predetermined times (T1, T2, T3) shifted from each other between the paper conveyance control unit 200, the image formation control unit 210, and the fixing control unit 220 and have different assertion periods (T4, T5, T6). Therefore, in the operation example in FIG. 3, the presence or absence of an FB_FFC_SENS input signal is detected in each of the periods determined based on the predetermined times (T1, T2, T3) and the assertion periods (T4, T5, T6) allocated to the control units, i.e., in each of the detection periods of "T1 to (T1+T4)", "T2 to (T2+T5)", and "T3 to (T3+T6)", with reference to the FFC_SENS output signal (in this example, with reference to the time of assertion). When the FB_FFC_SENS input signal is not detected, the connection state of a connector is not good and the detection result that indicates the occurrence of a connection abnormality is obtained.

In the procedure illustrated in the flowchart in FIG. 4, the engine control unit 100 first sets "T1 to (T1+T4)" with reference to the FFC_SENS output signal (in this example, with reference to the time of assertion), i.e., the period between T1 and (T1+T4) with reference to the time at which the FFC_SENS output signal is asserted, as a detection period, and detects whether the FB_FFC_SENS input signal is asserted for T4 in this period (Step S102).

When it is not detected in Step S102 that the FB_FFC_SENS input signal is asserted for T4 in the above predetermined period (No in Step S102), the engine control unit 100 obtains a detection result that indicates the occurrence of a connection abnormality in the connectors 105₁ and 205 connected to the paper conveyance control unit 200 to which the above period is allocated (Step S103).

When it is detected in Step S102 that the FB_FFC_SENS input signal is asserted for T4 in the above predetermined period (Yes in Step S102), or after the abnormality is detected in Step S103, in the next procedure, the engine control unit 100 sets "T2 to (T2+T5)", i.e., the period between T2 and (T2+T5) with reference to the time at which the FFC_SENS output signal is asserted, as a detection period, and detects whether the FB_FFC_SENS input signal is asserted for T5 in this period (Step S104).

When it is not detected in Step S104 that the FB_FFC_SENS input signal is asserted for T5 in the above predetermined period (No in Step S104), the engine control unit 100 obtains a detection result that indicates the occurrence of a connection abnormality in the connectors 105₂ and 225 connected to the fixing control unit 220 to which the above period is allocated (Step S105).

When it is detected in Step S104 that the FB_FFC_SENS input signal is asserted for T5 in the above predetermined period (Yes in Step S104), or after the abnormality is detected in Step S105, in the next procedure, the engine control unit 100 sets "T3 to (T3+T6)", i.e., the period between T3 and (T3+T6) with reference to the time at which the FFC_SENS output signal is asserted, as a detection period, and detects whether the FB_FFC_SENS input signal is asserted for T6 in this period (Step S106).

When it is not detected in Step S106 that the FB_FFC_SENS input signal is asserted for T6 in the above predetermined period (No in Step S106), the engine control unit 100 obtains a detection result that indicates the occurrence of a connection abnormality in the connectors 105₃ and 215 connected to the image formation control unit 210 to which the above period is allocated (Step S107).

When it is detected in Step S106 that the FB_FFC_SENS input signal is asserted for T6 in the above predetermined period (Yes in Step S106), or after the abnormality is detected in Step S107, in the next procedure, if the engine control unit 100 determines that there is no connection abnormality in any connector on the basis of the detection results of the connection state of the connectors performed in the three detection periods (Yes in Step S108), the engine control unit 100 ends the detection operation performed in accordance with this flow.

In contrast, if there is a connection abnormality in any of the connectors (No in Step S108), the engine control unit 100 performs the abnormality process in accordance with the detection results (Step S109). In this example, in the abnormality process, the engine control unit 100 requests the controller 700 to identify a circuit board of a control unit connected to the connector that causes a bad connection and displays the abnormality (error) content on the liquid crystal display unit (LCDC) of the operating unit control board 750.

As described above, due to the operation performed by the connector-connection-state detection circuit in the present embodiment, it is possible to return a response signal (FB_FFC_SENS input signal) during the period allocated corresponding to each connector and separately detect FB_FFC_SENS input signals for each connector in the allocated period that is a detection period; therefore, the connection state can be detected for a specific connector. Moreover, it is sufficient to detect the presence or absence of a signal for detecting an FB_FFC_SENS input signal. In other words, it is sufficient to perform the detection process of a signal voltage by using any single threshold; therefore, there is an advantage in that it is not necessary to detect the signal voltage with high accuracy compared with the conventional technology, which identifies a bad connection portion by a signal voltage detection method. Moreover, false detection of a response signal can be reduced by making the assertion periods different from each other.

Execution Time of Detection Operation

In the connector-connection-state detection circuit in the present embodiment, a connection-state detection signal (FFC_SENS output signal) is basically output at any time. However, actually, the CPU resources and the like are limited; therefore, it is effective to perform the detection operation of the connection state at a predetermined time to maintain the performance of the electronic apparatus (apparatus) suitably.

One point when the detection operation of the connection state can be effectively performed is when the electronic apparatus is turned on. The connectors that connect between the circuit boards and are detection targets of the connection state also function to transmit signals necessary for original operations of the electronic apparatus other than the detection operation of the connection state. Therefore, it is preferable to perform the detection operation of the connection state when the electronic apparatus is brought into a normal operation state where the electronic apparatus can perform its original operations at the time of start-up. When the electronic apparatus is off, changes may occur in the connection state of the connectors; therefore, the time at which the electronic apparatus is turned on is a preferable time to perform the detection operation.

Moreover, in terms of the execution time of the detection operation of the connection state, it is desirable that, when the electronic apparatus is brought into a normal operation state at the time of start-up, the detection operation is started and performed before a transmission and reception operation of signals other than a connection-state detection signal (FFC_SENS output signal) and a response signal (FB_FFC_SENS input signal) for the detection operation is performed. This is because if failures that occur during the operations in the circuit are detected all at once, a failure that occurs due to the connection state of a connector is also included in the failures and therefore it becomes more difficult to identify the cause of a failure. However, if the connection state of connectors is first confirmed, it is possible to identify that the cause of a failure is a bad connection of a connector before such a failure occurs. Thus, it becomes easy to identify the cause of a failure.

Another point when the detection operation of the connection state can be effectively performed is when the electronic apparatus is recovered from the power saving operation. In the image forming apparatus, the power saving operation is performed, for example, by lowering the temperature of a fixing heater when the apparatus is idling to the temperature when the apparatus is on standby and by stopping the supply of DC power to some of the circuit boards by turning off the power source for the control modules related to engine control. When the electronic apparatus is recovered from the power saving operation state to the operating state, the electronic apparatus is brought into a normal operation state. At this point, the electronic apparatus performs the detection operation of the connection state. When the electronic apparatus is recovered from the power saving operation, if the power is supplied to a circuit board that has stopped its operation, in a similar manner to the time when the electronic apparatus is turned on, it is desirable that the detection operation of the connection state is started and performed before a transmission and reception operation of signals other than an FFC_SENS output signal and an FB_FFC_SENS input signal is performed.

The detection operation of the connection state is performed also when the electronic apparatus is recovered from the power saving operation; therefore, it is possible to regularly detect a connection failure that occurs, for example, when a motor comes into contact with an FFC harness due to changes in the operation of the motor over time and thus the FFC harness is broken.

Notification of Operation Abnormality Signal

Next, an explanation will be given of a notification unit that notifies the engine control unit 100, which is an upper-level control unit, of an operation abnormality signal of CPU runaway or the like, which is generated in each circuit board of the paper conveyance control unit 200, the image formation control unit 210, and the fixing control unit 220 for each circuit board.

In the image forming apparatus according to the present embodiment, the notification unit for an operation abnormality signal notifies the engine control unit 100 of an operation abnormality signal (WDRST signal), which notifies the engine control unit 100 of an operation abnormality that occurs in each of the paper conveyance control unit 200, the image formation control unit 210, and the fixing control unit 220, by using the signal lines that are also used for transmitting response signals (FB_FFC_SENS input signals) in the connector connection state detection. As illustrated in FIG. 2, the circuit configuration is such that a WDRST signal detected by each of the CPUs 202, 212, and 222 of the paper conveyance control unit 200, the image formation control unit 210, and the fixing control unit 220 is connected to the signal line that transmits an FB_FFC_SENS input signal to the CPU 102 of the engine control unit 100 by wired-OR connection.

Moreover, it is necessary to identify the control unit that generates an operation abnormality signal (WDRST signal), which is connected to a response signal (FB_FFC_SENS input signal) in the connector connection state detection by wired-OR connection and is notified; therefore, the engine control unit 100 applies the following methods for detecting these signals to be received.

The first method is a method of first selecting a period in which an FB_FFC_SENS input signal is not generated to separate a WDRST signal from an FB_FFC_SENS input signal and detecting a WDRST signal to be transmitted at a time allocated to each control unit that is a transmission source.

The period in which an FB_FFC_SENS input signal is not generated in the first method is a period in which an FFC_SENS output signal is not transmitted. The engine control unit 100 transmits an FFC_SENS output signal by itself; therefore, the engine control unit 100 knows this period. Thus, the engine control unit 100 receives a notified WDRST signal by selecting the period in which the engine control unit 100 does not transmit an FFC_SENS output signal and detects the received WDRST signal by a detection method that is similar to the method used for detecting the connector connection state.

In other words, the engine control unit 100 detects the presence or absence of a WDRST signal and identifies the control unit that is a transmission source of the WDRST signal by the method of confirming whether the signal is detected at the time allocated to each of the paper conveyance control unit 200, the image formation control unit 210, and the fixing control unit 220 and obtains the detection result that indicates the control unit in which an operation abnormality occurs.

The second method, in contrast to the first method, is a method of detecting the control unit in which an operation abnormality occurs at an arbitrary time without limiting the detection period to the period in which an FFC_SENS output signal is not transmitted.

In this detection method, it is needed to add a method of detecting an operation abnormality signal (WDRST signal) separately from an FB_FFC_SENS input signal and detecting the control unit that is a transmission source of a WDRST signal among the paper conveyance control unit 200, the image formation control unit 210, and the fixing control unit 220 in addition to the detection method of identifying the control unit that is a transmission source of a response signal (FB_FFC_SENS input signal), which is applied in the connector connection state detection.

In the method applied to identify a transmission source of a WDRST signal in the second method, the assertion periods of a WDRST signal from the control units that are transmission sources are made different from each other and are also made different from the assertion period that is a given condition for an FB_FFC_SENS input signal. In other words, the control unit that is a transmission source of a WDRST signal can be uniquely specified on the basis of the length of the assertion period. Therefore, each WDRST signal and each response signal (FB_FFC_SENS input signal) can be distinguished from each other simply by selecting the time at which a WDRST signal does not overlap with an FB_FFC_SENS input signal and transmitting a WDRST signal at the time allocated to each control unit that is a transmission source, whereby the connector connection state detection and the notification of an operation abnormality signal can be performed in parallel.

Figure 5:
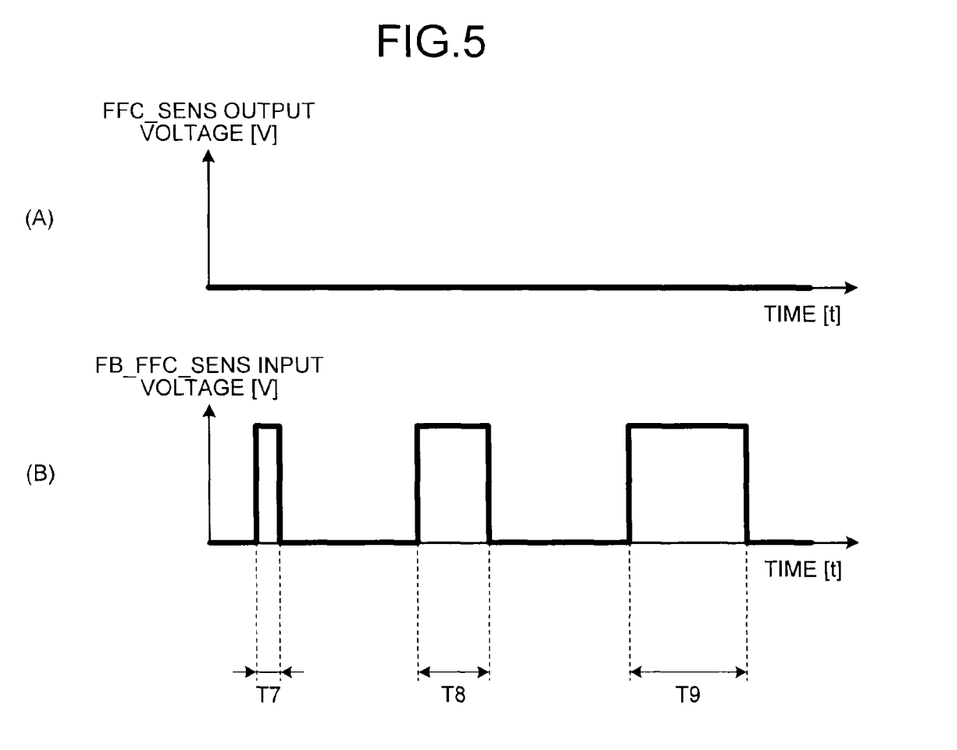
FIG. 5 is a timing chart illustrating a relationship between an FFC_SENS output signal (connection-state detection signal) and FB_FFC_SENS input signals (abnormality detection signals) that are transmitted and received between circuit boards via connectors.

FIG. 5 is a timing chart illustrating a relationship between an FFC_SENS output signal (connection-state detection signal) and FB_FFC_SENS input signals (abnormality detection signals) that are transmitted and received between the circuit boards via the connectors. FIG. 5 illustrates signals in the operation example in which WDRST signals, each of which is connected to an FB_FFC_SENS input signal by wired-OR connection and whose assertion periods are different from each other, are transmitted from the control units that are transmission sources during the period in which an FFC_SENS output signal is not output. In FIG. 5, part (A) illustrates an FFC_SENS output signal and part (B) illustrates WDRST signals each of which is transmitted by being connected to an FB_FFC_SENS input signal by wired-OR connection. In FIG. 5, the horizontal axis indicates the time and the vertical axis indicates the voltage [V].

The FFC_SENS output signal in part (A) of FIG. 5 is a signal in a state where the output is zero, i.e., the FFC_SENS output signal is not transmitted. The FB_FFC_SENS input signals in part (B) of FIG. 5 are WDRST signals that are transmitted from the control units by wired-OR connection during a period in which the FFC_SENS output signal is not transmitted. The FB_FFC_SENS input signals input to the CPU 102 of the engine control unit 100 are signals that rise at different times and have different assertion periods for each of the paper conveyance control unit 200, the image formation control unit 210, and the fixing control unit 220 that transmit a WDRST signal.

As illustrated in the operation example in FIG. 5, different times are allocated to the WDRST signals transmitted from the paper conveyance control unit 200, the image formation control unit 210, and the fixing control unit 220 and the WDRST signals are multiplexed in accordance with the assertion periods (T7, T8, T9). The assertion periods (T7, T8, T9) are as follows. It is desirable that the assertion periods (T7, T8, T9) are different from the assertion periods (T4, T5, T6) used in the connector connection state detection and a unique value is allocated to each of the assertion periods (T7, T8, T9).

T7: Period during which the CPU 202 of the paper conveyance control unit 200 asserts a WDRST signal T8: Period during the CPU 222 of the fixing control unit 220 asserts a WDRST signal T9: Period during the CPU 212 of the image formation control unit 210 asserts a WDRST signal An explanation will be given of the transmission operation of a WDRST signal from each of the paper conveyance control unit 200, the image formation control unit 210, and the fixing control unit 220 in the operation example in FIG. 5. The paper conveyance control unit 200, the image formation control unit 210, and the fixing control unit 220 receive a connection-state detection signal (FFC_SENS output signal) output from the CPU 102 of the engine control unit 100 at the same time. Therefore, each control unit that receives the FFC_SENS output signal can use the end of the assertion period of the FFC_SENS output signal as a reference. When the CPUs 202, 212, and 222 of the paper conveyance control unit 200, the image formation control unit 210, and the fixing control unit 220 transmit WDRST signals, the CPUs 202, 212, and 222 perform an operation of transmitting the WDRST signals, which are asserted for different assertion periods (T7, T8, T9), at predetermined times allocated to return the WDRST signals at different times to each other with reference to the end of the assertion period of the FFC_SENS output signal.

The time at which the assertion time of the WDRST signal is determined and the time at which the assertion period is determined are set by storing setting values in the FROMs 201, 211, and 221 included in the paper conveyance control unit 200, the image formation control unit 210, and the fixing control unit 220, respectively, or the like. The setting values can be changed. The setting change can be performed in a similar manner to the setting change described in the transmission operation of a response signal (FB_FFC_SENS input signal) in the connector connection state detection.

As described above, because the CPUs 202, 212, and 222 of the paper conveyance control unit 200, the image formation control unit 210, and the fixing control unit 220 transmit WDRST signals as signals which are asserted at predetermined times shifted from each other and whose assertion periods are different from each other. Therefore, the CPU 102 of the engine control unit 100 that receives the multiplexed WDRST signals can separately detect the WDRST signals for each control unit that is a transmission source and thus can receive a notification of an operation abnormality signal and identify the connector that is a transmission source. Moreover, it is sufficient to detect the presence or absence of a signal for detecting a WDRST signal; therefore, a high detection accuracy is not required.

Procedure of Notification Operation of Operation Abnormality Signal

Figure 6:
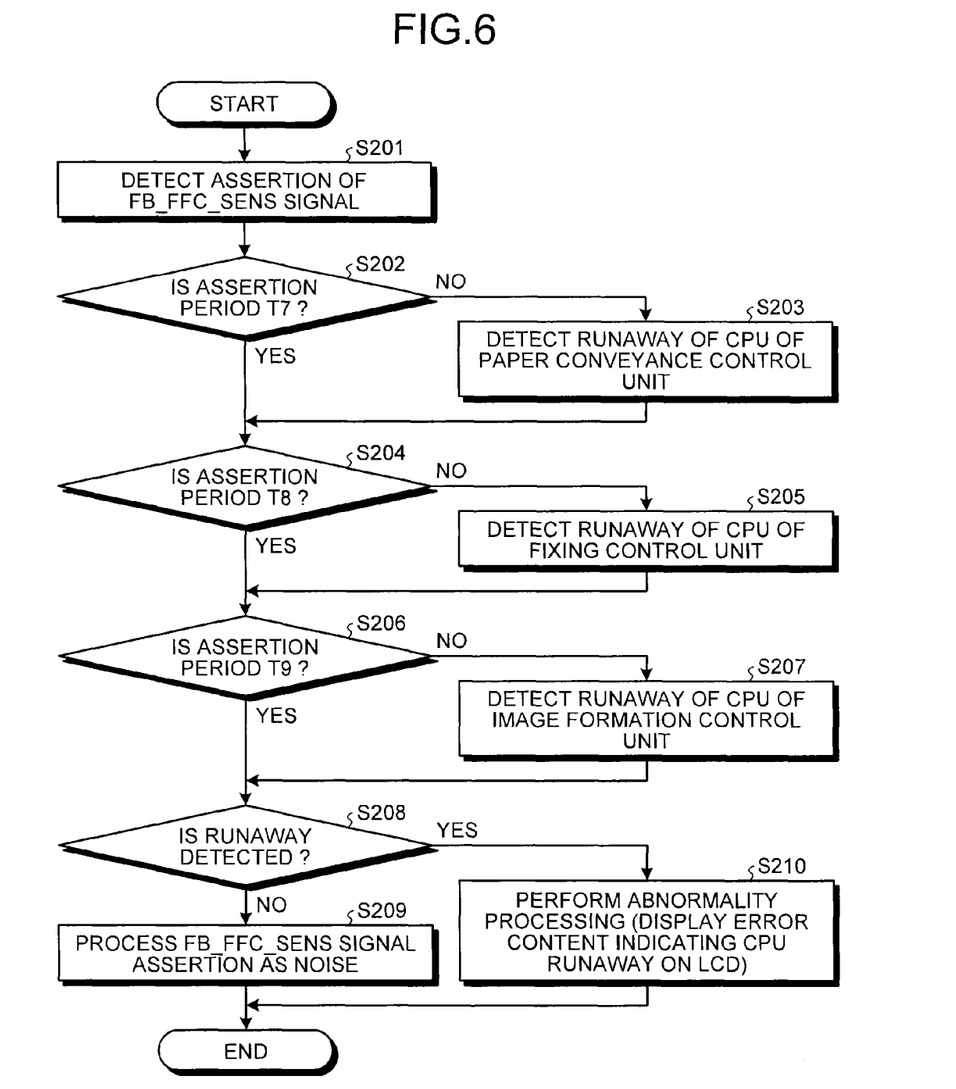
FIG. 6 is a flowchart illustrating the procedure of a notification operation of an operation abnormality signal performed by wired-OR connection by the connection-state detection circuit.

An explanation will be given of the procedure of the notification operation of an operation abnormality signal with reference to the operation example in FIG. 5 performed by the connector-connection-state detection circuit in the present embodiment. FIG. 6 is a flowchart illustrating the procedure of the notification operation of an operation abnormality signal performed by the connection-state detection circuit illustrated in FIG. 2. The notification operation illustrated in the flowchart in FIG. 6 is an operation that is started and performed by the CPU 102 of the engine control unit 100 in accordance with a command from the controller 700, which is an upper-level control unit. This notification operation is started when the connector connection state detection is performed.

When the engine control unit 100 starts the notification operation illustrated in the flowchart in FIG. 6, the engine control unit 100 first outputs a connection-state detection signal (FFC_SENS output signal) from the CPU 102 via each of the connectors connected to the paper conveyance control unit 200, the image formation control unit 210, and the fixing control unit 220, and thereafter detects an FB_FFC_SENS input signal transmitted from each control unit (Step S201). The FB_FFC_SENS input signal detected in this step includes a WDRST signal transmitted by wired-OR connection. In the procedure in the following steps, a process is performed in which the detection operation of detecting a signal corresponding to a WDRST signal is performed and a notification result of an operation abnormality signal that indicates the presence or absence of a predetermined WDRST signal is obtained.

The notification process separately detects WDRST signals that are multiplexed and transmitted as signals that are asserted at predetermined times shifted from each other between the paper conveyance control unit 200, the image formation control unit 210, and the fixing control unit 220 and have different assertion periods (T7, T8, T9). The predetermined times for shifting the assertion times from each other between the control units is determined, for example, with reference to the falling edge of an FFC_SENS output signal received by each control unit. When the notification operation is performed in parallel with the connector connection state detection, it is necessary to prevent a WDRST signal transmitted from each control unit from overlapping with an FB_FFC_SENS input signal used for the connector connection state detection.

In the procedure illustrated in the flowchart in FIG. 6, the engine control unit 100 first detects whether an FB_FFC_SENS input signal that is a detection target is asserted in a detection period of a WDRST signal of the paper conveyance control unit 200 that is asserted at the time set for the paper conveyance control unit 200 and has the assertion period T7 (Step S202).

When it is not detected in Step S202 that the FB_FFC_SENS input signal is asserted for T7 in the above detection period of the WDRST signal (No in Step S202), the engine control unit 100 obtains a notification result that indicates the detection of an operation abnormality, such as CPU runaway, in the paper conveyance control unit 200 to which the above period is allocated (Step S203).

When it is detected in Step S202 that the FB_FFC_SENS input signal is asserted for T7 in the above detection period of the WDRST signal (Yes in Step S202), or after the notification of an operation abnormality in Step S203 is received, in the next procedure, the engine control unit 100 detects whether the FB_FFC_SENS input signal that is a detection target is asserted in the detection period of a WDRST signal of the fixing control unit 220 that is asserted at the time set for the fixing control unit 220 and has the assertion period T8 (Step S204).

When it is not detected in Step S204 that the FB_FFC_SENS input signal is asserted for T8 in the above detection period of the WDRST signal (No in Step S204), the engine control unit 100 obtains a notification result that indicates the detection of an operation abnormality, such as CPU runaway, in the fixing control unit 220 to which the above period is allocated (Step S205).

When it is detected in Step S204 that the FB_FFC_SENS input signal is asserted for T8 in the above detection period of the WDRST signal (Yes in Step S204), or after the notification of an operation abnormality in Step S205 is received, in the next procedure, the engine control unit 100 detects whether the FB_FFC_SENS input signal that is a detection target is asserted in the detection period of a WDRST signal of the image formation control unit 210 that is asserted at the time set for the image formation control unit 210 and has the assertion period T9 (Step S206).

When it is not detected in Step S206 that the FB_FFC_SENS input signal is asserted for T9 in the above detection period of the WDRST signal (No in Step S206), the engine control unit 100 obtains a notification result that indicates the detection of an operation abnormality, such as CPU runaway, in the image formation control unit 210 to which the above period is allocated (Step S207).

When it is detected in Step S206 that the FB_FFC_SENS input signal is asserted for T9 in the above detection period of the WDRST signal (Yes in Step S206), or after the notification of an operation abnormality in Step S207 is received, in the next procedure, if the engine control unit 100 determines that there is no operation abnormality, such as CPU runaway, in any control unit on the basis of the notification results of an operation abnormality performed in the three detection periods (No in Step S208), the engine control unit 100 determines that the FB_FFC_SENS input signal detected in Step S201 is noise and performs a process of discarding the notification results (Step S209), and ends the notification operation performed in accordance with this flow.

In contrast, if it is notified that an operation abnormality, such as CPU runaway, is detected in any of the control units (Yes in Step S208), the engine control unit 100 performs the abnormality process in accordance with the notification results (Step S210). In this example, in the abnormality process, the engine control unit 100 requests the controller 700 to identify, for example, a CPU of the control unit in which an operation abnormality is detected and displays the abnormality (error) content on the liquid crystal display unit (LCDC) of the operating unit control board 750.

As described above, due to the notification operation of an operation abnormality by the connector-connection-state detection circuit in the present embodiment, it is possible to transmit an FB_FFC_SENS input signal that includes a WDRST signal transmitted by wired-OR connection during the period allocated corresponding to each of the paper conveyance control unit 200, the image formation control unit 210, and the fixing control unit 220 and separately gives a notification of the FB_FFC_SENS input signal for each of the paper conveyance control unit 200, the image formation control unit 210, and the fixing control unit 220 in the assertion period of a WDRST signal that is a detection period; therefore, an operation abnormality can be detected for a specific control unit.

Moreover, the notification operation of an operation abnormality can be performed in parallel with the connector connection state detection by using the connector-connection-state detection circuit. Accordingly, the number of signal lines of the harnesses can be reduced; therefore, the circuit configuration can be simplified compared with the system in which the notification unit for an operation abnormality is independently configured.

In the above example of the circuit configuration, FFC harnesses and connectors that connect the terminals of the FFC harnesses to the circuit modules are used; however, it is possible to apply other harnesses, such as a polyvinyl chloride wire, in a similar manner. Moreover, the connector-connection-state detection circuit described above applies, as an example, a circuit configuration composed of the paper conveyance control unit 200, the image formation control unit 210, and the fixing control unit 220, which are lower-level control units, and the engine control unit 100; however, the connector-connection-state detection circuit may be applied to any circuit as long as the circuit is configured by providing connectors that connect a specific circuit board and a plurality of other circuit boards, which exchange signals with each other, for each of the other circuit boards.

According to the present invention, an effect is obtained where the connection state can be suitably detected for each of a plurality of connectors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic apparatus comprising:
    a connection-state detection circuit that includes:
        a first circuit board;
        a plurality of second circuit boards that each exchange a signal with the first circuit board;
        a plurality of connectors that connect the first circuit board and each of the plurality of second circuit boards, respectively;
        a transmitting unit that transmits a connection-state detection signal from the first circuit board to each of the second circuit boards via their respective connectors;
        a control unit that causes the second circuit boards to return response signals to the first circuit board in response to the received connection-state detection signal via the connectors at different times that are shifted from each other and are respectively allocated to the second circuit boards; and
        a detecting unit that detects whether the response signal returned from each of the second circuit boards is received so as to detect a connection state of each of the connectors,
    wherein:
    the connectors function to transmit another signal other than the connection-state detection signal and the response signal, and
    when the electronic apparatus is brought into a normal operation state at a time of start-up of the electronic apparatus, the connection-state detection circuit starts a detection operation of a connection state before a transmission operation of the another signal via the connectors is performed.

2. The electronic apparatus according to claim 1, wherein the response signal is a signal whose assertion period is different for each of the second circuit boards.

3. The electronic apparatus according to claim 1, wherein the control unit causes each of the second circuit board to return the response signal at a time when a predetermined time has elapsed after the connection-state detection signal is asserted.

4. The electronic apparatus according to claim 1, wherein the electronic apparatus has a function of performing a power saving operation of stopping power supply to at least any of the circuit boards when the electronic apparatus is idling, the connectors function to transmit another signal other than the connection-state detection signal and the response signal, and when the electronic apparatus is brought into a normal operation state at a time when a power source is recovered from the power saving operation, the connection-state detection circuit starts a detection operation of a connection state before a transmission operation of the another signal via the connectors is performed.

5. The electronic apparatus according to claim 1, further comprising an operation abnormality notification unit that notifies the first circuit board of an operation abnormality signal that indicates an operation abnormality that occurs in each of the second circuit boards, wherein the operation abnormality notification unit includes
a unit that transmits the operation abnormality signal such that it does not overlap with a period in which the response signal is returned, by using a signal line on which the connection-state detection circuit returns the response signal via the connectors, and
a unit that detects whether a return time of the operation abnormality signal to be transmitted is within a predetermined period determined for each of the second circuit boards and receives a notification of an operation abnormality signal generated for each of the second circuit boards on a basis of a detection result.

6. The electronic apparatus according to claim 5, wherein the operation abnormality signal is a signal whose assertion period is different for each of the second circuit boards.

7. A computer program product comprising a non-transitory computer readable medium containing a computer program that causes a computer to function as the connection-state detection circuit according to claim 1.

8. A computer program product comprising a non-transitory computer readable medium containing a computer program that causes a computer to function as the connection-state detection circuit and the operation abnormality notification unit according to claim 5.

9. A connector-connection-state detection method performed in an electronic apparatus that includes a first circuit board, a plurality of second circuit boards which each exchange a signal with the first circuit board, and a plurality of connectors that connect the first circuit board and each of the plurality of second circuit boards, respectively, the method comprising:
transmitting a connection-state detection signal from the first circuit board to each of the second circuit boards via their respective connectors;
causing the second circuit boards to return response signals to the first circuit board in response to the received connection-state detection signal via the connectors at different times that are shifted from each other and are respectively allocated to the second circuit boards; and
detecting whether the response signal returned from each of the second circuit boards is received so as to detect a connection state of each of the connectors,
the method further comprising:
transmitting, using at least one of the connectors, another signal other than the connection-state detection signal and the response signal, and
detecting operation of a connection state before a transmission operation of the another signal, when the electronic apparatus is brought into a normal operation state at a time of start-up of the electronic apparatus.

10. An electronic apparatus comprising:
a connection-state detection circuit that includes:
a first circuit board;
a plurality of second circuit boards that each exchange a signal with the first circuit board;
a plurality of connectors that connect the first circuit board and each of the plurality of second circuit boards, respectively;
a transmitting unit that transmits a connection-state detection signal from the first circuit board to each of the second circuit boards via their respective connectors;
a control unit that causes the second circuit boards to return response signals to the first circuit board in response to the received connection-state detection signal via the connectors at different times that are shifted from each other and are respectively allocated to the second circuit boards; and
a detecting unit that detects whether the response signal returned from each of the second circuit boards is received so as to detect a connection state of each of the connectors,
wherein
the electronic apparatus has a function of performing a power saving operation of stopping power supply to at least any of the circuit boards when the electronic apparatus is idling,
the connectors function to transmit another signal other than the connection-state detection signal and the response signal, and
when the electronic apparatus is brought into a normal operation state at a time when a power source is recovered from the power saving operation, the connection-state detection circuit starts a detection operation of a connection state before a transmission operation of the another signal via the connectors is performed.

* * * * *